UNITED STATES PATENT OFFICE.

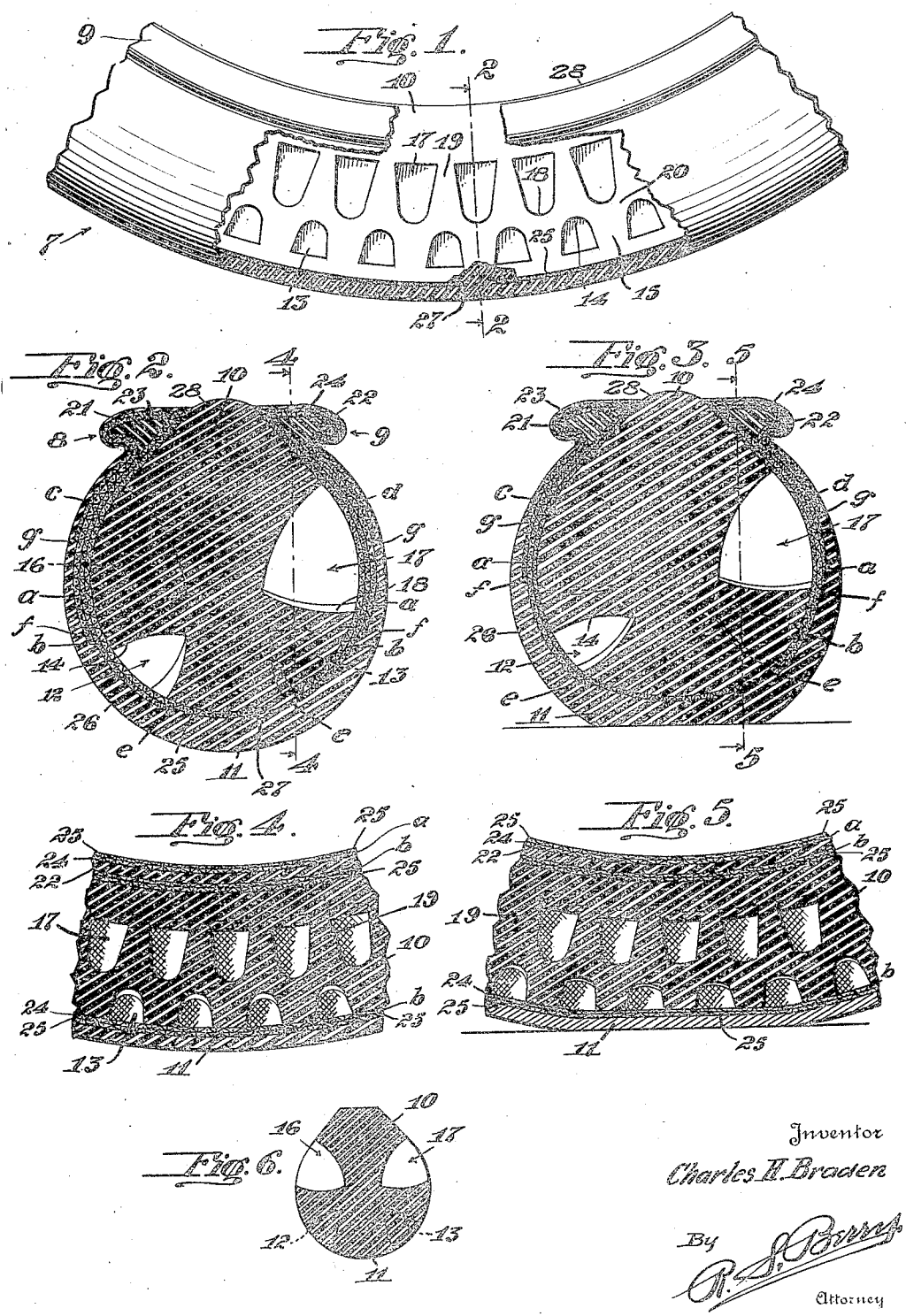

CHARLES H. BRADEN, OF LOS ANGELES, CALIFORNIA, ASSIGNOR TO NATIONAL AIRLESS TIRE COMPANY, OF LOS ANGELES, CALIFORNIA, A CORPORATION OF NEVADA.

AIRLESS TIRE.

1,423,074.     Specification of Letters Patent.     Patented July 18, 1922.

Application filed April 27, 1921. Serial No. 464,808.

*To all whom it may concern:*

Be it known that I, CHARLES H. BRADEN, a citizen of the United States, residing at Los Angeles, in the county of Los Angeles and State of California, have invented new and useful Improvements in Airless Tires, of which the following is a specification.

My invention relates to a tire which is especially applicable for use on the wheels of auto vehicles and the like, and particularly pertains to a tire of the cushion or airless type embodying a casing and a resilient self sustaining core arranged in the casing; and in which the core is formed with recesses on its sides spanned by the side portions of the casing. Tires of this type as ordinarily constructed have proven objectionable as a large part of the casing is not properly supported and is liable to become misshapen because the portions of the casing spanning the recesses are subject to being readily indented.

An object of my invention is to overcome this objection and to provide a tire of the above character in which the core is formed with side recesses and intervening walls so shaped and arranged as to afford substantial support for the walls of the casing and effect such distribution of compression and elongation stresses imposed on the tire under the wheel load and by unevenness of road surface as to impart smooth and easy riding qualities to the tire.

Another object is to provide a means whereby the casing and core may be securely fastened together to form an integral structure.

A further object is to provide a construction whereby the tire will be stiffened and strengthened along its inner perimeter and adjacent its connection with the wheel rim, and have its greatest flexibility at and adjacent its tread portion.

With the foregoing objects in view, and such other objects as may subsequently appear, my invention consists in the details of construction and in the form and arrangement of parts, or their equivalents, hereinafter described and claimed and illustrated by way of example in the accompanying drawings, in which;

Figure 1 is a view in side elevation of the lower portion of the tire with part of the casing removed showing the core therein in side elevation.

Figure 2 is an enlarged detail in section as seen on the line 2—2 of Figure 1 showing the tire in its normal condition.

Figure 3 is a view in cross section showing the tire in a state of compression as under wheel load.

Figure 4 is a detail in section as seen on the line 4—4 of Figure 2 on a reduced scale.

Figure 5 is a view in section as seen on the line 5—5 of Figure 3 on a reduced scale.

Figure 6 is a view in cross section illustrating a modified form of the core.

More specifically 7 indicates an annular tubular casing divided on its inner periphery and provided with flanges or shoulders 8 and 9 on the opposite side of its inner margin adapted to be engaged by a wheel rim as is common in pneumatic tire construction.

An important feature of my invention resides in an annular self sustaining core 10 arranged within the casing, such as rubber or rubber composition and is preferably secured to the casing by vulcanizing thereto. The core is designed to fill the casing except as to air spaces formed by cavities in the core as later described, and is formed with a continuous outer circumferential face to extend along the inner surface of the tread portion 11 of the casing. A series of cavities 12 are formed in the core and arranged in a row around the core near the outer or greater perimeter thereof and to one side of the circumferential center of the core; a like series of cavities 13 being formed and arranged on the opposite side of the core. The cavities 12 and 13 open towards the sides of the core below the transverse center of the core body with the bottom walls of the cavities inclined upwardly into the core. The sides of the cavities converge upwardly toward each other and terminate in arched or concave-convex walls 14 forming the inner margins of the cavities. The walls between adjacent cavities constitute tapered columns 15 which are of gradually increasing thickness and sectional area from adjacent the tread to their intersection with the walls 14. In the preferred embodiment of the invention the row of cavities on one side of the core are staggered relative to those on the other side so that a section taken transversely across the core through one of the cavities will pass through the column 15 between the cavities on the opposite side of the core.

Formed on each side of the core are other rows of cavities 16 and 17 arranged between the rows of cavities 12—13 and the inner periphery of the core with the cavities of the inner rows offset in relation to the cavities in the outer rows, as particularly shown in Figure 1. The outer end walls 18 of the cavities 16—17 are curved and continue into the side walls thereof, and the side walls diverge outwardly toward the inner periphery of the core, thus forming tapered columns 19 between adjacent cavities 16—17 converging from the walls 14 forming the arched ends of the cavities 12—13. The inner or bottom walls of the cavities 16—17 curve outwardly from the inner ends of the end walls to the surface of the core and terminate at a point adjacent to the beads 8 and 9. In the preferred embodiment of the invention as shown in Figures 2 and 3 the cavities 16 will be staggered in relation to the cavities 17. In some instances it may be desirable to arrange the cavities 12 and 16 on one side of the core directly opposite the cavities 13 and 17 on the opposite side of the core as shown in Figure 6, but in any event the cavities 12—13 are staggered or offset in relation to the cavities 16—17 so as to provide diagonal wall portions 20 extending between the outer cavities 12—13 and the inner cavities 16—17 and connecting the enlarged end portions of the columns 15 and 19. By this arrangement of the cavities, no continuous recess is formed radially across the sides of the core but a net-like arrangement of walls is formed on the sides of the core which when the core is placed in the casing will afford a substantial support for the sides of the casing to maintain it in shape, yet providing in the cavities sufficient dead air space in the core to afford lightness and flexibility and also provide an arrangement of wall thickness in the core sufficient to maintain the casing against collapse when subjected to pressure at any point.

The casing 7 is formed with annular reinforcing beads 21 and 22 along the margins of the divided inner periphery of the casing around which are folded strips of fabric 23 and 24; the edge portions $a$ and $b$ of the fabric strips being brought together along the side portions of the casing as will presently be described. The inner portion of the casing is lined throughout with a fabric sheet 25 the edge portions $c$ and $d$ of which are carried around the fabric strips 23 and 24 over the beads and continued over the outer edge portions $a$ of the strips. The inner edge portions $b$—$b$ of the strips 23 and 24 extend contiguous to the fabric sheet 25 with their extreme edges $e$ terminating in spaced relation to each other on opposite sides of the outer circumferential center of the casing so that the portions $b$ extend over the outer rows of cavities 12—13 as well as over the inner rows of cavities 16—17. The edges $f$ of the edge portions $a$ terminate intermediate the edges $e$ of the portions $b$ and the beads so that the outer portions $a$ extend over the inner rows of cavities 16—17. The edges $g$ of the edge portions $c$ and $d$ of the sheet 25 terminate intermediate the edges $f$ and the beads. By this arrangement of the fabric strips and sheet, a series of layers of fabric encompass the beads and extend along the side portions of the casing at the point where the casing is subjected to the greatest strains and wear close to its engagement with the wheel rim and where stiffness in the sides of the casing is desired; the layers of fabric decreasing in number in step relation toward the tread portion of the casing to give increasing flexibility to the outer portions of the sides of the casing progressing toward the tread portion with the greatest flexibility at the tread portion. This arrangement also provides a greater thickness of fabric over the inner row of cavities and at the point where the tire is subject to the greatest lateral strain under wheel load. The number of strips and sheets of fabric may be increased as occasion may require. The fabric strips are embedded in a rubber body and the outer surfaces thereof are covered with a body of rubber or rubber composition 26 having a thickened portion to form the tread 11 of the casing and has sides of gradually decreasing thickness up and over the beads, as is common in tire casing construction.

In order to insure a substantial engagement between the core and casing, the inner fabric sheet 25 is formed with openings 27 preferably located along the inner face of the tread portion of the casing and opposite the tread portion of the core, whereby the tread portion of the core will be brought into direct contact with the rubber forming the tread portion of a casing through the openings, so that the two bodies of rubber on opposite sides of the fabric may be vulcanized together and thus form a secure anchorage between the core and casing.

From the foregoing it will be seen that I have provided a tire in which a core or filler is encompassed by a casing with the core formed with a row of recesses on each side of the tread portion and with a second row of recesses on each side of the core extending between the transverse center of the core and the inner periphery thereof with the recesses in the inner row staggered in relation to those of the outer row; the recesses extending into the body of the core to points spaced from the opposite sides of the vertical center of the core body, so that a substantial continuous circumferential wall will extend between the inner and outer peripheries of the core opposite the entire tread surface of the casing to form a uniform support therefor.

When the tire is placed under a state of compression as under the wheel load the portion thereof resting on the ground tends to flatten causing an upward pressure on the side columns 15 which is transmitted through the diagonal portion 20 to the columns 19. The columns 15 being comparatively short and terminating at the upper ends in the cavities or spaces 17 permit of their ready flexture both under compression and elongation stresses so as to provide greater flexibility and shock absorbing qualities adjacent the tread portion of the casing for taking up minor shocks. The columns 15 and 19 being tapered prevents of their ready flexture under stresses imposed thereon from any direction, thus further adding to the flexibility of the side portions of the casing.

By offsetting the recesses on one side of the core from those on the other, a substantial body of material is formed between the cavities and the opposite side of the core, so that the core will offer substantially equal resistance to distortion throughout, that is to say, will have no portions of successively greater resistance to distortion than others other than the increased surface flexibility, so as to render the tire easy riding and equalize wear thereon.

Tires of the type to which my invention appertains, as ordinarily constructed, have proven objectionable as a rule chiefly because the attempt has been to construct a filler for casings rather than to construct a tire in which the filler and casing constitute practically a one piece tire.

It has been found practically impossible to construct a casing filler separable from the casing which will retain resilience and at the same time remain tight enough in the casing to prevent internal friction and consequent heat and rapid disintegration, and if the filler is placed tight enough in the casing to prevent friction the resilience is largely squeezed out of the filler and the desired flexibility of the tire lost.

In forming the tire in accordance with my invention a core and casing are constructed to closely conform to each other and are vulcanized together throughout their contacting surfaces to form a unitary structure; and to obviate the objections stated the rubber of the core is brought into direct contact with the rubber of the casing through spaces in the fabric reinforcing or lining of the latter, preferably at the tread, and the contiguous bodies of rubber vulcanized together.

As a means for setting up a lateral pressure outwardly on the beads 21 and 22 when the tire is mounted on a rim, the core 10 is formed so that when disposed within the casing a portion of the inner periphery of the core will project beyond the inner periphery of the casing, as indicated at 28, which is adapted to be compressed against the wheel rim when the tire is applied and thereby set up a compression within the core.

Having thus described my invention, what I claim is:

1. In a tire of the character described, the combination with a wheel rim having side flanges of a casing divided on its inner periphery and formed with outwardly projecting beads on its inner margins, engageable with the flanges of the rim and a core enclosed in said casing having a continuous inner periphery extending through the divided portion of the casing and projecting beyond the inner periphery of the casing adapted to be compressed against the periphery of the wheel rim and thereby effect an outward pressure on said beads.

2. In a tire of the character described, an annular core having a pair of rows of cavities opening outwardly on each of the opposite sides thereof, the cavities in each row being separated by tapered columns, the cavities in one row of the pair of rows being offset in relation to the cavities in the other row, the columns of the inner row decreasing circumferentially in width toward the inner periphery of the core, and the columns of the outer row decreasing circumferentially in width toward the outer periphery of the core; there being a central body in said core extending between the inner and outer perimeters thereof separating the cavities on one side of the core from those on the other side.

3. In a tire of the character described in combination with the wheel rim having side flanges of a casing divided on its inner periphery and a core enclosed in said casing having a continuous inner periphery extending through the divided portion of the casing and projecting beyond the inner periphery of the casing adapted to be compressed against the periphery of the wheel rim and thereby effecting outward pressure on the side portions of the casing adjacent its inner periphery.

CHARLES H. BRADEN.